US008456652B2

(12) United States Patent
Unno

(10) Patent No.: US 8,456,652 B2
(45) Date of Patent: Jun. 4, 2013

(54) IMAGE FORMING APPARATUS AND METHOD FOR CONTROLLING SHEET CONVEYANCE INTERVALS IN SAME

(75) Inventor: Kouichi Unno, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 315 days.

(21) Appl. No.: 12/850,971

(22) Filed: Aug. 5, 2010

(65) Prior Publication Data

US 2011/0037990 A1 Feb. 17, 2011

(30) Foreign Application Priority Data

Aug. 12, 2009 (JP) ................................ 2009-187484

(51) Int. Cl.
*G06K 15/00* (2006.01)
*G03G 15/20* (2006.01)

(52) U.S. Cl.
USPC ........ 358/1.12; 358/1.13; 358/1.18; 358/496; 271/3.15; 271/3.17; 271/265.02; 399/68; 347/14; 347/16; 347/19; 347/104

(58) Field of Classification Search
USPC ............. 358/1.12, 1.18, 496, 1.13; 271/3.17, 271/259, 265.02; 399/66–69; 347/14, 16, 347/19, 104
See application file for complete search history.

(56) References Cited

U.S. PATENT DOCUMENTS 6,604,805 B2 * 8/2003 Nguyen et al. .................. 347/14
6,708,018 B2 3/2004 Sato et al.
6,909,863 B2 * 6/2005 Umezawa ....................... 399/90
7,542,153 B2 * 6/2009 Park ............................ 358/1.12
7,775,519 B2 * 8/2010 Takahashi et al. ....... 271/258.01
7,950,656 B2 * 5/2011 Adams .......................... 271/262
8,020,985 B2 * 9/2011 Yoshida ........................ 347/104
8,199,383 B2 * 6/2012 Tokutsu et al. ............... 358/498
8,294,941 B2 * 10/2012 Maehira ....................... 358/1.17
2001/0033050 A1 * 10/2001 Kinoshita et al. ............ 271/3.17
2004/0141199 A1 * 7/2004 Park ............................ 358/1.12
2004/0190924 A1 * 9/2004 Iwasaki et al. .................. 399/68
2006/0221165 A1 * 10/2006 Kato ............................ 347/104

FOREIGN PATENT DOCUMENTS

JP 2002-347987 12/2002

* cited by examiner

*Primary Examiner* — Dennis Dicker
(74) *Attorney, Agent, or Firm* — Fitzpatrick, Cella, Harper & Scinto

(57) ABSTRACT

An image forming apparatus that forms images on sheets by using input image data, the apparatus including: a detection unit that detects a blank area outside of an image forming area formed on a sheet; a setting unit that, when a sum of a length in a conveyance direction of a blank area on a trailing edge side in the conveyance direction of a sheet and a length in the conveyance direction of a blank area on a leading edge side in the conveyance direction of a sheet conveyed following the sheet is a reference value or less, sets a sheet conveyance interval to the reference value, and when the sum is greater than the reference value, sets the conveyance interval to be less than the reference value; and a conveying unit that conveys the sheets at the conveyance interval set by the setting unit.

7 Claims, 9 Drawing Sheets

| Page ID (601) | ORIGINAL DOCUMENT SIZE (602) | BLANK _HS (603) | BLANK _HE (604) | BLANK _VS (605) | BLANK _VE (606) |
|---|---|---|---|---|---|
| 1 | A4 | 15 | 15 | 20 | 20 |
| 2 | A4 | 15 | 15 | 20 | 20 |
| 3 | A4 | 15 | 15 | 20 | 20 |
| 4 | A3 | 10 | 10 | 0 | 0 |
| ⋮ | | | | | |
| 20 | A4 | 15 | 15 | 20 | 20 |

FIG. 6

| Page ID (701) | BLANK_HS (702) | WIDTH (703) | BLANK_HE (704) | BLANK_VS (705) | LENGTH (706) | BLANK_VE (707) |
|---|---|---|---|---|---|---|
| 1 | 15 | 267 | 15 | 20 | 170 | 20 |
| 2 | 15 | 267 | 15 | 20 | 170 | 20 |
| 3 | 15 | 267 | 15 | 20 | 170 | 20 |
| 4 | 10 | 277 | 10 | 0 | 420 | 0 |
| ⋮ | | | | | | |
| 20 | 10 | 277 | 10 | 20 | 170 | 20 |

IMAGE FORMING APPARATUS AND METHOD FOR CONTROLLING SHEET CONVEYANCE INTERVALS IN SAME

BACKGROUND OF THE INVENTION

1. Field of the Invention

The present invention relates to an image forming apparatus and a method for controlling an image forming apparatus.

2. Description of the Related Art

Conventionally, there are image forming apparatus that read an original document with a sensor such as a CCD, generate image data, and form an image on a sheet by using the generated image data. There are also image forming apparatus that receive print data from a PC on a network, analyze and expand the received print data to generate image data, and form an image on a sheet by using the generated image data. In such image forming apparatus, the number of pages that can be read per unit time has increased because it has become possible to drive sensors such as CCDs to read original documents at high speed. In addition, because the speed of CPUs provided in image forming apparatus has increased and the cost of the faster CPUs has decreased, the print data received from a PC on a network can be expanded at high speed.

In light of these circumstances, there is a growing demand to increase productivity in operations to form images on sheets.

In order to improve productivity in an image forming operation, an image forming apparatus disclosed in Japanese Patent Laid-Open No. 2002-347987 is known that forms images at a shortened sheet conveyance interval (an interval between two sheets that are successively fed). By shortening the sheet conveyance interval, the number of image formed sheets per unit time increases, resulting in improved productivity of the image forming apparatus.

With the conventional image forming apparatus, however, when setting the sheet conveyance interval to be short, the extent to which the sheet conveyance interval can be shortened is limited.

For example, when developer is applied to a sheet and the developer is fixed, because heat is absorbed from the fixing unit during the fixing process of the developer, it is necessary to increase the temperature of the fixing unit to a temperature necessary to fix the developer until an image is formed on the next sheet.

For this reason, with the conventional image forming apparatus, the sheet conveyance interval can be set only to intervals during which the temperature of the fixing unit can be increased sufficiently.

In other words, the conventional image forming apparatus determines the sheet conveyance interval without taking into consideration a blank area that exists outside of the area in which an image is formed on a sheet.

If images formed on sheets include a blank area, the temperature of the fixing unit can be increased to a temperature necessary to fix the developer during the time between the formation of an image on a sheet and the formation of an image area on the next sheet. In this case, due to the length in the conveyance direction of the blank area, there is enough time to increase the temperature of the fixing unit.

SUMMARY OF THE INVENTION

An aspect of the present invention is to eliminate the above-mentioned problems with the conventional technology.

The present invention provides an image forming apparatus and a method for controlling an image forming apparatus that improves productivity by determining the sheet conveyance interval taking into consideration a blank area that exists outside of the area in which an image is formed on a sheet.

The present invention in its first aspect provides an image forming apparatus that forms images on sheets by using input image data, the apparatus comprising:

a detection unit configured to detect a blank area outside of an image forming area formed on a sheet;

a setting unit configured to, when a sum of a length in a conveyance direction of a blank area on a trailing edge side in the conveyance direction of a sheet and a length in the conveyance direction of a blank area on a leading edge side in the conveyance direction of a sheet conveyed following the sheet is a reference value or less, set a sheet conveyance interval to the reference value, and when the sum is greater than the reference value, set the conveyance interval to be less than the reference value; and a conveying unit configured to convey the sheets at the conveyance interval set by the setting unit.

The present invention in its second aspect provides a method for controlling an image forming apparatus that forms images on sheets by using input image data, the method comprising the steps of:

detecting a blank area outside of an image forming area formed on a sheet;

setting a sheet conveyance interval to a reference value when a sum of a length in a conveyance direction of a blank area on a trailing edge side in the conveyance direction of a sheet and a length in the conveyance direction of a blank area on a leading edge side in the conveyance direction of a sheet conveyed following the sheet is the reference value or less, and setting the conveyance interval to be less than the reference value when the sum is greater than the reference value; and conveying the sheets at the conveyance interval set in the setting step.

According to the present invention, the sheet conveyance interval is determined taking into consideration blank areas that exist outside of the area in which an image is formed on a sheet, and therefore productivity can be improved.

Further features of the present invention will become apparent from the following description of exemplary embodiments with reference to the attached drawings.

BRIEF DESCRIPTION OF THE DRAWINGS

FIG. 6 is a diagram showing a table including blank area information generated for page printing.

DESCRIPTION OF THE EMBODIMENTS

Figure 1:
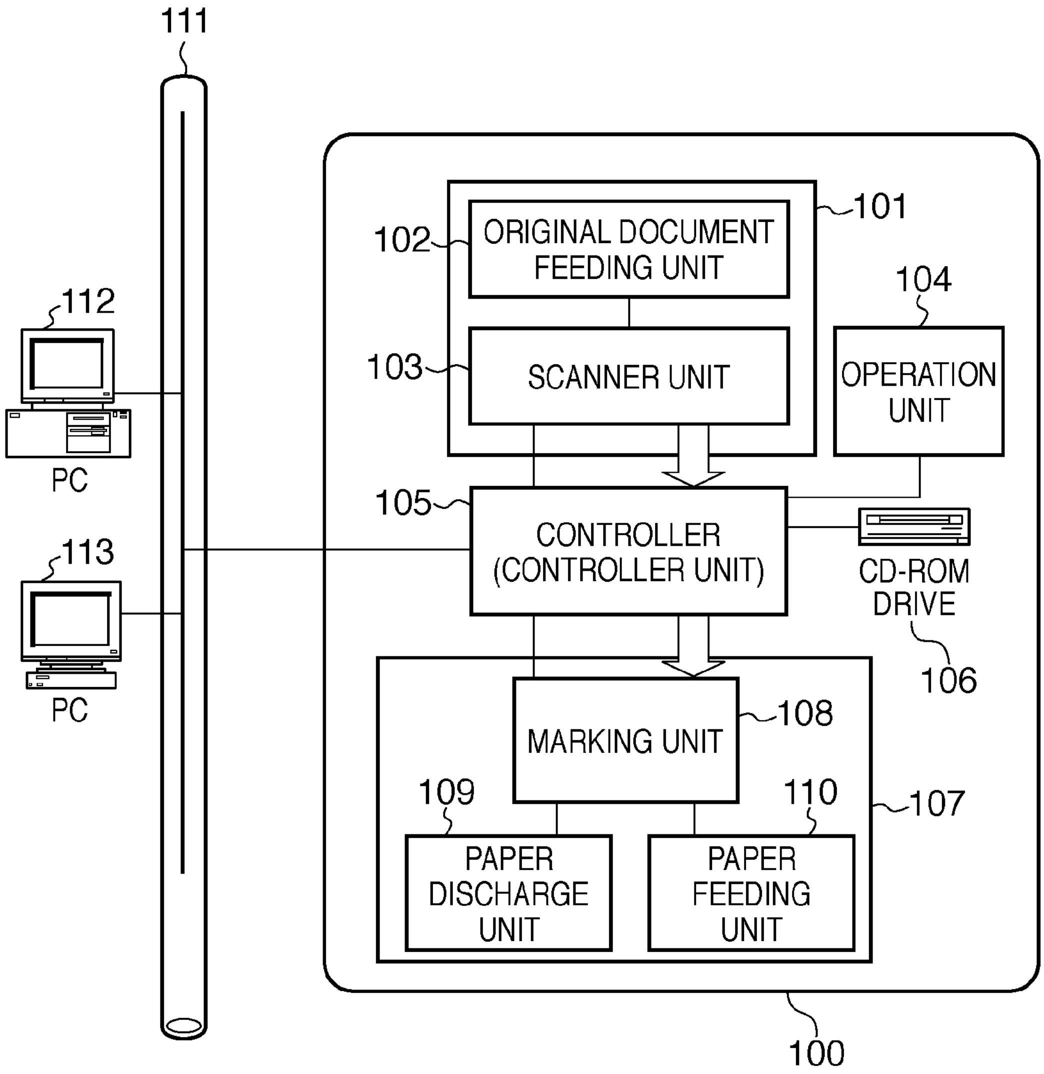
FIG. 1 is a diagram showing an overall configuration of an image forming system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

The same components are given the same reference numerals and redundant descriptions thereof will be omitted. Configuration blocks required for embodiments of the present invention will be described first, and then processing will be described in detail.

Embodiment 1

FIG. 1 is a diagram showing an overall configuration of an image forming system according to the present invention.

The image forming system includes a PC 112, a PC 113 and an image forming apparatus 100. These elements are connected via a network 111.

The image forming apparatus 100 includes a reader unit 101, an operation unit 104, a printer unit 107, and so on.

The reader unit (image input apparatus) 101 optically reads an image from an original document and converts the image to image data. The reader unit 101 includes a scanner unit 103 that has a function for reading an original document, and an original document feeding unit 102 that has a function for conveying the original document. A user can use the original document feeding unit 102 to cause an original document having a plurality of pages to be sequentially conveyed and read.

The printer unit (image output apparatus) 107 conveys a sheet (also referred to as a "print medium" or "recording paper"), forms image data on the sheet as a visible image, and discharges the sheet outside the apparatus. The printer unit 107 includes a paper feeding unit 110 that has a plurality of types of paper feeding cassettes, a marking unit 108 that has a function for transferring and fixing images onto sheets, and a paper discharge unit 109 that has a function for sorting or stapling the sheets on which images have been formed and discharging the sheets to the exterior.

A controller 105 is electrically connected to the reader unit 101 and the printer unit 107, and is also connected to the PCs 112 and 113 as host computers via the network 111.

The controller 105 controls the reader unit 101 to read an image from an original document, and generates image data corresponding to the read image. Then, the controller 105 controls the printer unit 107 to form an image on a sheet based on the generated imaged data and discharge the sheet (copy function).

The controller 105 also converts the image data read by the reader unit 101 to code data, and transmits the data to the host computer via the network 111 (data transmission function).

The controller 105 also converts print data (code data) received from the host computer via the network 111 to image data, and outputs the data to the printer unit 107 (printer function).

The operation unit 104 is a user interface that is connected to the controller 105 and in which a liquid crystal display unit and a touch panel are integrally formed. The controller 105 displays operation screens on the operation unit 104, or receives instructions from the user via the operation unit 104. The controller 105 is also connected to an external storage unit such as a CD-ROM drive 106.

Figure 2:
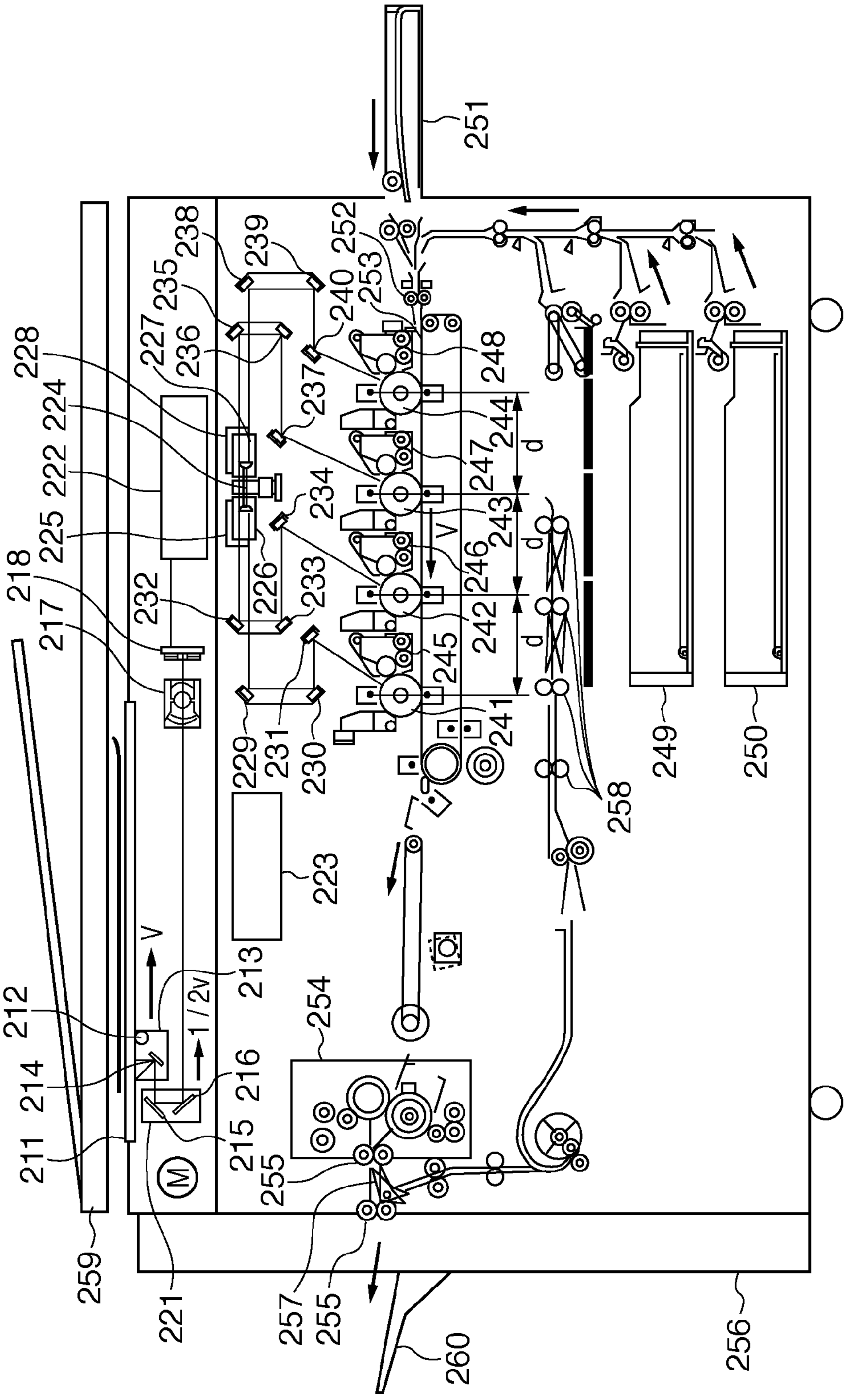
FIG. 2 is a diagram showing an overview including a reader unit and a printer unit.

FIG. 2 is a diagram showing an overview of the reader unit 101 and the printer unit 107. An original document feeding unit 259 provided in the reader unit 101 feeds an original document sequentially, sheet by sheet, onto a platen glass 211, and discharges the original document from the platen glass 211 after the completion of the original document reading operation. When the original document is conveyed onto the platen glass 211, a lamp 212 is lit, and an optical unit 213 starts moving, emits light and scans the original document. The light reflected by the original document at this time is guided to a CCD image sensor (hereinafter referred to as a "CCD") 218 via mirrors 214, 215 and 216, and a lens 217. In this manner, the scanned images of the original document are read by the CCD 218. A reader image processing unit 222 performs prescribed processing on the image data obtained as a result of reading the images of the original document and output from the CCD 218, and outputs the image data to the controller 105 via a scanner interface 306 shown in FIG. 3.

Figure 3:
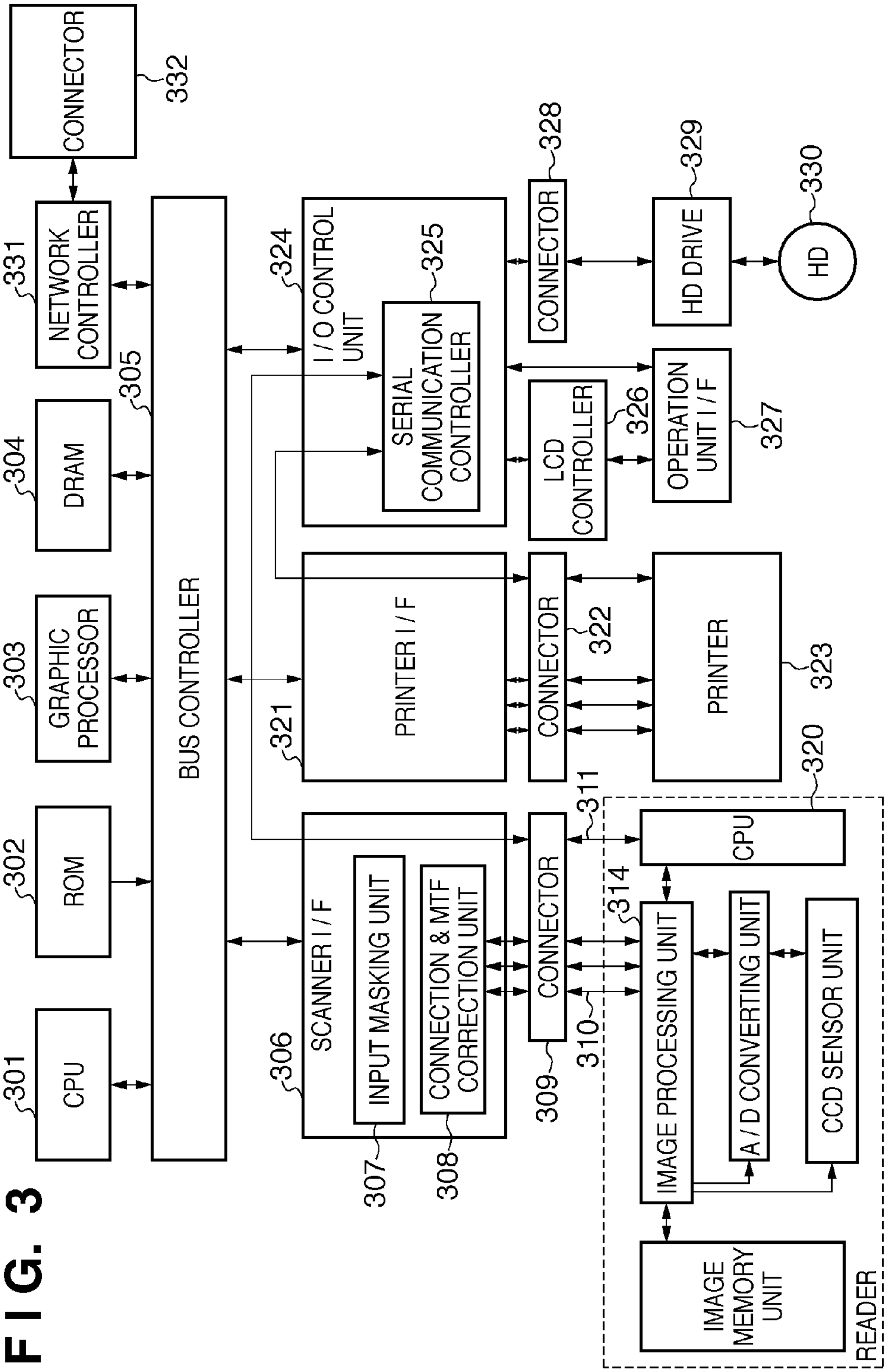
FIG. 3 is a diagram showing functional blocks of a controller (controller unit).

A printer image processing unit 223 outputs an image signal transmitted from the controller 105 via a printer interface 321 shown in FIG. 3 to a laser driver 224. The laser driver 224 of a printer 323 drives laser emitting units 225, 226, 227 and 228, and causes the laser emitting unit 225, 226, 227 and 228 to emit laser light according to the image data output from the printer image processing unit 223. Photosensitive drums 241, 242, 243 and 244 are irradiated with the laser light via mirrors 229, 230, 231, 232, 233, 234, 235, 236, 237, 238, 239 and 240. After irradiation, latent images according to the laser light are formed on the photosensitive drums 241, 242, 243 and 244. Developing units 245, 246, 247 and 248 develop the latent images with black (Bk), yellow (Y), cyan (C), and magenta (M) toners, respectively. The developed toners of the respective colors are transferred onto a sheet, whereby a full-color print is produced.

A sheet (print medium, recording paper) from any one of paper feeding cassettes 249 and 250 and a manual feed tray 251, is fed in synchronization with the start of laser light irradiation, and then conveyed through a resist roller 252, attached onto a transfer belt 253, and conveyed. Then, the developer (toners) adhering to the photosensitive drums 241, 242, 243 and 244 is transferred. The sheet on which the developer has been transferred is conveyed to a fixing unit 254, and the developer is fixed onto the sheet by the fixing unit 254 through the application of heat and pressure. The sheet that has passed through the fixing unit 254 is discharged onto a discharge tray 260 by a discharge roller 255. A paper discharge unit 256 bundles and sorts the discharged sheets, and staples the sorted sheets. In the case where double-sided recording is set, the sheet is conveyed to the discharge roller 255, and after that, the rotation direction of the discharge roller 255 is reversed to guide the sheet to a re-feeding convey path 258 by a flapper 257. The sheets guided to the re-feeding convey path 258 is fed to the transfer belt 253 at the above-described timing. The developer adhering to the photosensitive drums 241, 242, 243 and 244 is transferred to the sheet fed to the transfer belt 253, the developer is fixed by the fixing unit 254, and the sheet is discharged to the discharge tray 260.

Controller

FIG. 3 is a block diagram showing a configuration of the controller (controller unit) 105.

A CPU 301 performs overall control of the image forming apparatus 100. The CPU 301 performs operations based on a program read from a ROM 302. The operation of interpreting print data (page description language (PDL) code data) received from a PC such as the PC 112 or the PC 113 and expanding the data to image data (raster image data) is also written in the program, and is processed by software. The CPU 301 reading and executing the program stored in the ROM 302 or the like also implements each process of a flowchart described later. A bus controller 305 controls transfer of data input and output to and from each interface, and also controls bus arbitration and DMA data transfer.

A DRAM 304 is connected to the CPU 301 via the bus controller 305, used as a work area for the CPU 301 to perform operations and also used as an area for storing image data. A graphic processor 303 performs processing, such as image rotation, image scaling, color space conversion and binarization, on the raster image data stored in the DRAM 304. The graphic processor 303 is connected to the DRAM 304 via the bus controller 305, and the data transfer between the graphic processor 303 and the DRAM 304 is performed by DMA transfer controlled by the bus controller 305. A network controller 331 is connected to the CPU 301 via the bus controller 305, and connects to an external network via a connector 332. The external network can be, for example, Ethernet®.

An I/O control unit 324 is equipped with a 2-channel serial communication controller 325 for transmitting and receiving control commands to and from a CPU 320 of the reader unit and a CPU of the printer 323.

An operation unit interface 327 is connected to the I/O control unit 324 via an LCD controller 326, and controls input and output of data to and from the operation unit 104. A signal input via the operation unit 104 is transmitted to the CPU 301 via the I/O control unit 324, and the operation unit 104 displays image data transmitted from the I/O control unit 324. An HD drive 329 is connected to the I/O control unit 324 via a connector 328, and is connected to an HD (hard disk) 330. The CPU 301 controls the HD drive 329 to store image data in the HD 330 and read image data from the HD 330.

The scanner interface 306 and the printer interface 321 are each connected to the bus controller 305. The scanner interface 306 is connected to the CPU 320 of the reader unit via a connector 309 and is connected by a scanner bus 310. The scanner interface 306 has a function for performing prescribed processing on the images received from the reader unit 101. The scanner interface 306 also has a function for outputting, to the scanner bus 310, a control signal generated based on a video control signal transmitted from the reader unit 101. The data transfer from the scanner bus 310 to the DRAM 304 is controlled by the bus controller 305.

The printer interface 321 is connected to the printer 323 via a connector 322, and has a function for performing prescribed processing on the image data output from the DRAM 304 and outputting the processed data to the printer 323. Transfer of the raster image data expanded into the DRAM 304 to the printer unit is controlled by the bus controller 305, and the data is DMA transferred to the printer 323 via the printer interface 321.

Figure 4:
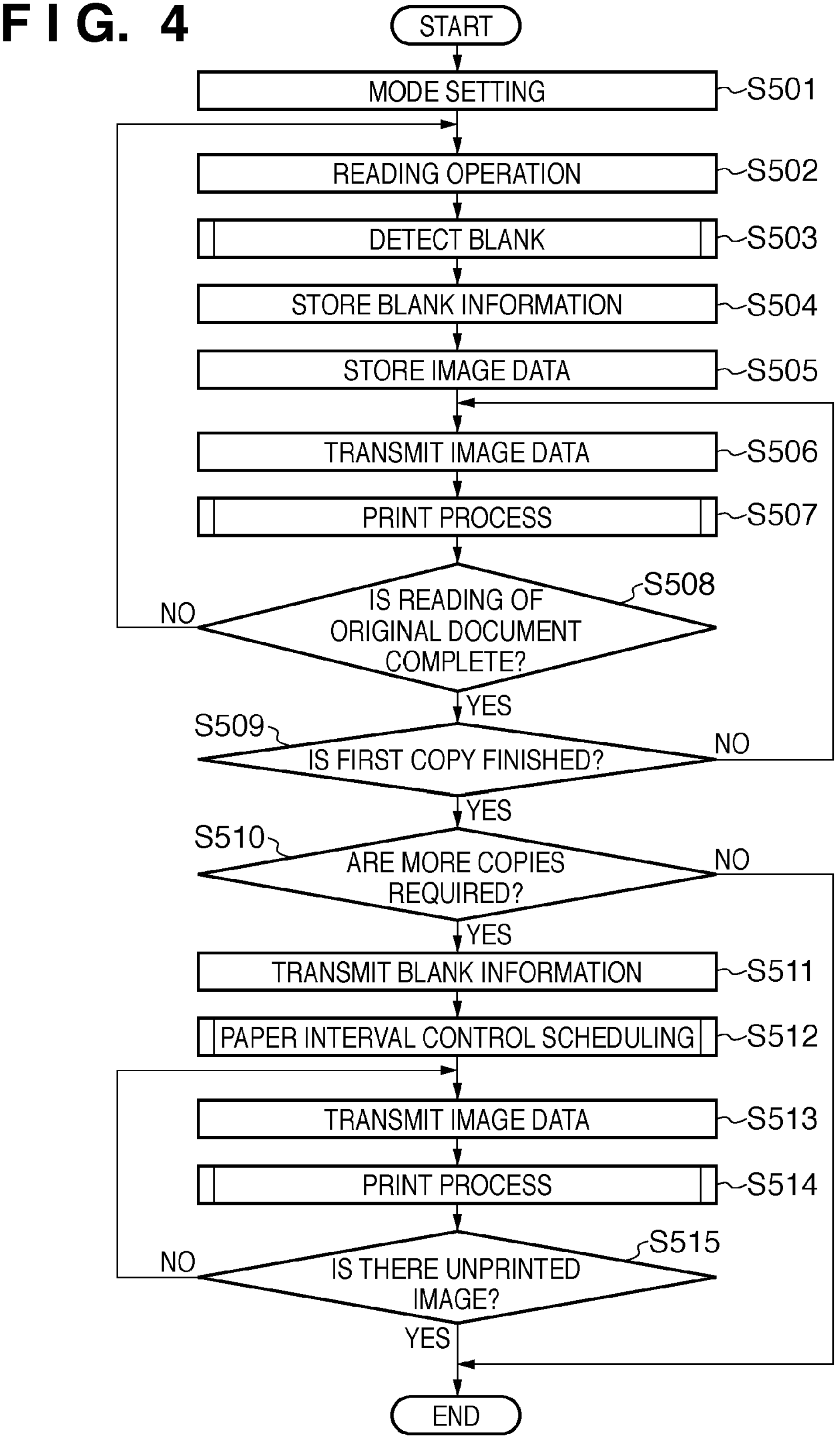
FIG. 4 is a flowchart showing a procedure of a print process according to an embodiment of the present invention.

FIG. 4 is a flowchart showing a procedure of a copy operation in which the image data read by the reader unit 101 is printed by the printer unit 107, which is performed in the above-described configuration. The processes shown in the flowchart of FIG. 4 are performed by the CPU 301 executing the program stored in the ROM 302. In the following, the numbers, such as S501, indicate step numbers in the flowchart.

First, the CPU 301 displays a copy settings screen on the operation unit 104, and receives various settings such as the number of copies and copy darkness from the user. In the case where the image forming apparatus 100 includes a post-processing apparatus that performs stapling, binding or the like, the CPU 301 may be configured to receive post-processing settings as well via the operation unit 104. The CPU 301 stores the received settings in the DRAM 304.

After that, when an instruction to read an original document is issued with a start key provided in the operation unit 104, the CPU 301 advances the process to S502.

In S502, the CPU 301 causes the reader unit 101 to read the original document. The original document may be placed on the platen provided in the scanner unit and read, or may be conveyed sequentially, sheet by sheet, by the original document feeding unit 102 and read. The image data output from the reader unit 101 is subjected to prescribed image processing by an image processing unit 314 provided in the reader unit 101 and input to the scanner interface 306. The CPU 320 of the reader unit 101 detects the size of the original document based on the input image data.

In S503, the CPU 301 executes the following processing on the input image data using a connection & MTF correction unit 308 and an input masking unit 307. Specifically, the CPU 301 determines whether the image data that has undergone MTF correction in the connection & MTF correction unit 308 is chromatic or achromatic, and detects a blank area in the image data. At this time, the input image data may be stored in a memory provided in the connection & MTF correction unit 308 and the input masking unit 307, and subjected to chromatic/achromatic determination and blank area detection. Alternatively, the input image data may be temporarily stored in the DRAM 304, and read and processed as appropriated by the connection & MTF correction unit 308 and the input masking unit 307. As used herein, the blank area refers to an area outside of the area in which an image is formed. In the case where the blank area is determined from the top, bottom, right and left margins of the sheet set in the image forming apparatus 100 via the operation unit 104, the blank area is detected by referring to these values. Alternatively, it is also possible to detect the blank area by setting a corresponding area in a sheet having the size set in the DRAM 304, rendering an image in the area, and counting the pixels from an end of the rendered image to an end of the corresponding area of the sheet by the CPU 301.

Figures 5A, 5B:
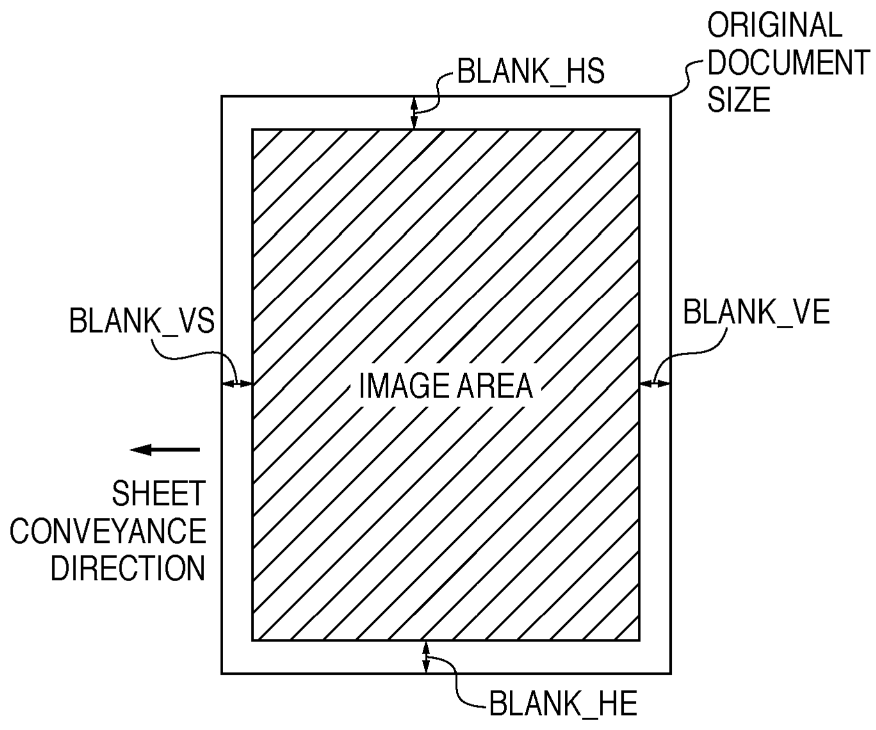
FIG. 5A is a diagram showing an example of calculated blank area information.
FIG. 5B is a diagram showing an example of calculated blank area information.

In S504, the CPU 301 stores information regarding the detected blank area in the DRAM 304 together with the original document size detected by the CPU 320 of the reader unit 101. An example of the data stored in the DRAM 304 is shown in FIG. 5B.

The data stored in the DRAM 304 will be described now with reference to FIGS. 5A and 5B. The data is stored in the form of a table. The table data shown in FIG. 5B includes a plurality of records. In the table data, Page ID 601 is an ID for each page of the original document. One page ID 601 is assigned to each page of the read original document by the CPU 301. Original Document Size 602 is the page size of the original document. BLANK_HS 603 is the amount of blank space in the leading edge of a sheet in the main scanning direction for image formation. BLANK HE 604 is the amount of blank space in the trailing edge of the sheet in the main scanning direction for image formation. BLANK_VS 605 is the amount of blank space in the leading edge of the sheet in the sub-scanning direction (the direction in which the sheet is conveyed) for image formation. BLANK_VE 606 is the amount of blank space in the trailing edge of the sheet in the sub-scanning direction for image formation. FIG. 5A shows areas corresponding to the amounts of blank space shown in FIG. 5B.

The image data input to the scanner interface 306 is subjected to image processing and blank amount detection in the connection & MTF correction unit 308 and the input masking unit 307, and thereafter is stored in the DRAM 304.

After that, in S505, the CPU 301 stores the image data stored in the DRAM 304 in the HD 330. The image data stored in the HD 330 and the blank information of the image data are associated with each other and managed using link information or the like.

When the image of a single page of the original document has been read and the image data of the original document has been stored in the HD 330, the CPU 301 requests the printer unit 107 to print an image on a sheet based on the image data. After that, each time the CPU 301 receives a notification indicating that the printer unit 107 is ready to print from the printer unit 107, the CPU 301 stores image data to be printed in the DRAM 304 from the HD 330. Then, the CPU 301 performs image processing on the image data in the graphic processor 303. In S506, the CPU 301 transfers the image data to the printer unit 107 via the DRAM 304. When the image data has been transferred to the printer unit 107, in S507, the CPU 301 causes the printer unit 107 to feed a sheet and form an image on the fed sheet.

The CPU 301 synchronously or asynchronously receives input of image data from the reader unit 101 and outputs image data to the printer unit 107. The CPU 301 makes a query, to the CPU 320 of the reader unit 101 via the serial communication controller 325, as to whether or not the original document has been read. The CPU 301 receives, via the serial communication controller 325, information in response to the query indicating that the original document has or has not been read. In S508, the CPU 301 determines whether or not the original document has been read based on the received information. If there is an unread original document (all the pages of the original document have not been read), the process returns to S502, where the CPU 301 continues the reading of the original document by the reader unit 101. If, on the other hand, the CPU 320 of the reader unit 101 sends a notification that the original document has been read to the CPU 301, the CPU 301 advances the process to S509.

In S509, the CPU 301 determines whether or not all of the image data of the original document stored in the HD 330 has been printed. For example, the CPU 301 can determine whether or not all of the image data of the original document has been printed by determining whether or not the image data of the original document has been transferred to the printer unit 107. If all of the image data of the original document has not been printed, the process returns to S506, where the CPU 301 transfers unprinted image data of the original document from the HD 330 to the printer unit 107 to print the unprinted image data. If, on the other hand, it is determined that all of the image data of the original document has been printed, in S510, the CPU 301 determines whether or not more copies are required. If printing a plurality of copies has been set in S501, control is performed to print the second and subsequent copies in the process after S510.

If it is determined in S510 that more copies are required, in S511, the CPU 301 acquires the blank area information stored in the DRAM 304.

In S512, the CPU 301 determines a sheet conveyance interval based on the acquired blank area information. The CPU 301 creates blank area information for page printing as shown in FIG. 6 based on the acquired blank area information. FIG. 6 includes image area (image forming area) information (width information 703 and length information 706) in addition to the blank area information shown in FIGS. 5A and 5B. WIDTH shown in FIG. 6 indicates the direction perpendicular to the conveyance direction, and LENGTH indicates the conveyance direction. From the information shown in FIG. 6, the CPU 301 makes a determination as follows based on the blank area and the sheet conveyance interval required to sufficiently increase the temperature of the fixing unit, and determines a conveyance interval at which sheets are actually conveyed. Here, the sheet conveyance interval required to sufficiently increase the temperature of the fixing unit 254 is referred to as a reference interval (reference value). Because the temperature of the fixing unit 254 decreases when developer applied to a sheet is fixed, it is necessary for the CPU 301 to increase the temperature of the fixing unit 254 in order to fix developer applied to the next sheet. If the developer applied to the next sheet is fixed while the temperature of the fixing unit 254 is not sufficiently high, the developer applied to the sheet is not stably fixed, resulting in degradation of image quality.

Accordingly, it is necessary for the CPU 301 to increase the temperature of the fixing unit 254 to a temperature sufficient to fix the developer during the time between the fixing of the developer applied to a sheet and the fixing of the developer applied to the next sheet. In other words, the temperature of the fixing unit 254 needs to be increased to a temperature required to fix the developer during the time between the trailing edge in the conveyance direction of an image forming area being formed on a sheet and the leading edge in the conveyance direction of an image forming area being formed on the next sheet. If an image formed on a sheet has a large blank area and therefore the interval between the image forming area of the sheet and the leading edge in the conveyance direction of an image forming area formed on a sheet conveyed following the sheet is large, the sheet interval can be reduced. This is because since no developer is applied to the blank area, it is unnecessary to increase the temperature before the blank area is formed, and it is only necessary to increase the temperature of the fixing unit 254 before an image forming area is formed in the sheet conveyed following the preceding sheet is formed, excluding the blank area. This can be applied to the case where an image formed on the subsequent sheet has a large blank area.

Thus, the CPU 301 calculates the sum of the length in the conveyance direction of a blank area located on the trailing edge side in the conveyance direction of a sheet and the length in the conveyance direction of a blank area located on the leading edge side in the conveyance direction of a sheet conveyed following the preceding sheet. If the sum is a reference interval (reference value) or less, the CPU 301 sets the sheet conveyance interval to the reference interval. If, on the other hand, the sum is greater than the reference interval, the sheet conveyance interval is set to be less than the reference interval. Then, the CPU 301 causes the printer unit 107 to convey sheets at the set sheet conveyance interval and print.

This will be described in detail with reference to FIGS. 7A and 7B.

Figure 7A:
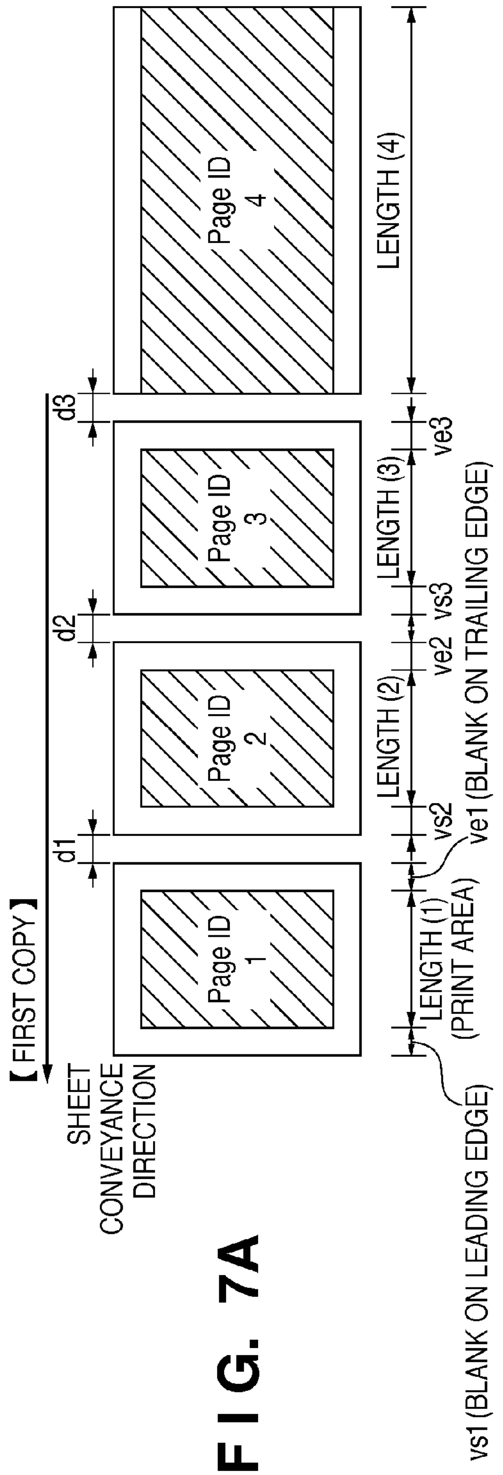
FIG. 7A is a diagram illustrating a print process according to an embodiment of the present invention.

FIG. 7A is a diagram showing a sheet conveyance interval determined without taking blank areas into consideration.

It is assumed here that the reference interval required to transfer and fix an image onto a sheet using the photosensitive drums 241, 242, 243 and 244 and the fixing unit 254 is defined as DP.

If the sheet conveyance interval is determined without taking blank areas into consideration, each sheet conveyance interval is as shown below.

$$d1=d2=d3=\ldots=DP \quad \text{(Equation 1)}$$

This indicates that the sheet intervals are all DP as shown in FIG. 7A.

Although each sheet interval is DP, the interval between image forming areas on sheets is the sum of the lengths of blank areas of images and that of a sheet interval. In other words, the interval between the image forming area of a sheet on which an image indicated by Page ID 1 is formed and the image forming area of a sheet on which an image indicated by Page ID 2 is formed can be expressed by ve1+d1+vs2.

Figure 7B:
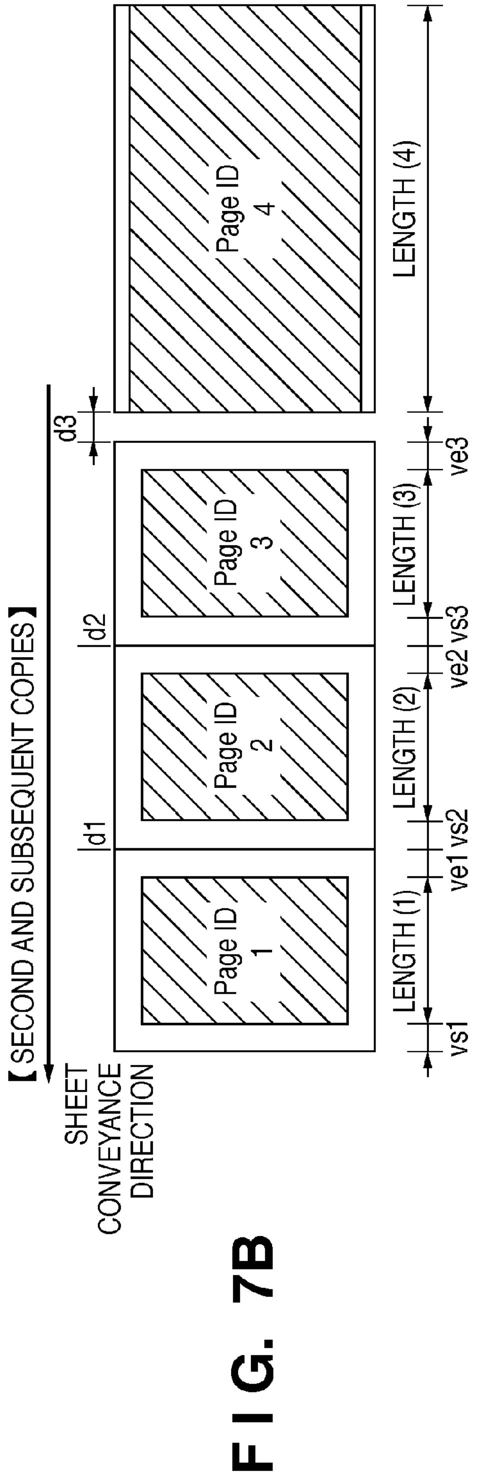
FIG. 7B is a diagram illustrating a print process according to an embodiment of the present invention.

FIG. 7B is a diagram showing a sheet conveyance interval determined in consideration of sheet blank area information. FIG. 7B shows an example in which the values of d1 and d2 can be set to 0. In FIG. 7B, d3 is set to DP. It is assumed that the length in the sheet conveyance direction of a blank on the trailing edge in the sub-scanning direction (conveyance direction) of the xth sheet (right margin) is defined as ve(x), and the length in the sheet conveyance direction of a blank on the leading edge in the sub-scanning direction of the (x+1)th sheet (left margin) is defined as vs(x+1). It is also assumed that the interval between the xth sheet and the (x+1)th sheet is defined as d(x). In this case, the CPU 301 determines d(x) as follows.

$$\text{If } ve(x)+vs(x+1)>DP,\ d(x)=0 \qquad \text{(Equation 2)}$$

$$\text{If } ve(x)+vs(x+1)\leqq DP,\ d(x)=DP \qquad \text{(Equation 3)}$$

According to the present embodiment, the sum of the length in the conveyance direction of a blank area on the trailing edge side in the conveyance direction of a sheet of interest and the length in the conveyance direction of a blank area on the leading edge side in the conveyance direction of the sheet conveyed following the preceding sheet is calculated, which is then compared with DP. Equation 3 shows the case where the sum equals or falls below the reference interval, and Equation 2 shows the case where the sum is greater than the reference interval. The values of ve(x) and vs(x) (the length in the conveyance direction of a blank area on the leading edge side in the conveyance direction, or in other words, the left margin) are listed under BLANK_VE 707 and BLANK_VS705 of FIG. 6.

When the paper interval d(x) is determined, in S513, the CPU 301 transmits image data for the second and subsequent copies, which is stored on the HD 330, to the printer unit 107 based on the data table shown in FIG. 6. Then, in S514, the CPU 301 causes the printer unit 107 to feed and convey sheets at the sheet paper interval determined in S512, and form images on the fed sheets.

In S515, the CPU 301 determines whether or not there is an image that has not been printed yet in the second copy. If there is an unprinted image, the process returns to S513. If, on the other hand, it is determined that there is no unprinted image, the process ends. The process from S510 to S515 is repeated in the same manner if a setting has been made to print the third and subsequent copies.

In the present embodiment, the timing when a sheet is fed from any one of the paper feeding cassettes 249 and 250 and the manual feed tray 251, the timing when image data is transmitted in S513, and the timing when the laser emitting units (225 to 228) emit light in the print process of S514 are varied, whereby the paper conveyance interval is optimized. As described above, in the present embodiment, the paper interval can be set to 0 in the case of Equation 2, and the paper interval can be prevented from becoming unnecessarily large in the case of Equation 3. In Equation 2, d(x) is set to 0, but it is not necessarily set to 0, and may be an interval necessary to fix an image onto a sheet, which is smaller than the predetermined interval DP. It is also possible to set d(x) to a value calculated from DP−ve(x)−vs(x+1).

As described above, in the present embodiment, when the sum of the length of an image blank area formed on a sheet and the length of an image blank area formed on the next sheet is greater than the reference interval, the sheet conveyance interval can be shortened. This increases the number of image formed sheets per unit time and improves productivity. Increasing the processing speed of the CPU 301 can shorten the time it takes to expand an image and become ready to transfer the image with the photosensitive drums and increase the processing speed, but this increases the cost of the CPU 301. With the present embodiment, it is possible to improve the productivity in image formation as compared to the case where the processing speed of the CPU 301 is increased while suppressing the cost increase of the CPU 301.

Embodiment 2

Sequence for Outputting PDL Images

Embodiment 1 described sheet conveyance control performed when the image forming apparatus 100 executes a copy operation. In Embodiment 2, sheet conveyance control performed when an image forming apparatus 100 outputs images based on print data (PDL data) received from an external PC 112 or 113 will be described. The configuration of the image forming apparatus 100 is almost the same as that of Embodiment 1, so a detailed description thereof is omitted here.

Figure 8:
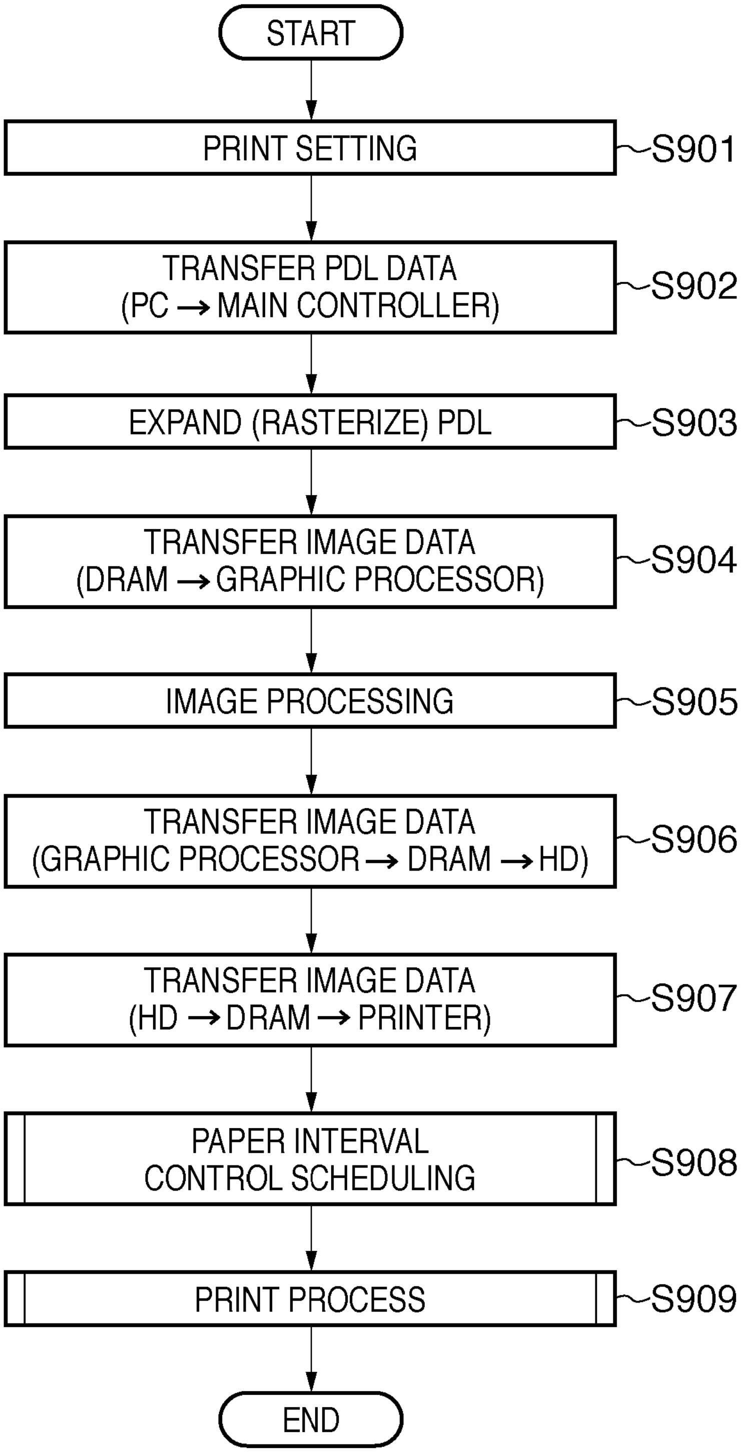
FIG. 8 is a flowchart showing a procedure of a print process according to Embodiment 2.

FIG. 8 is a flowchart showing a procedure for outputting images based on print data (PDL data) received from the external PC 112 or 113. The processes shown in the flowchart of FIG. 8 are performed by the CPU 301 executing a program stored in the ROM 302.

First, in S901, the CPU 301 receives print data (print job) from the external PC 112 or 113. The received print data is stored in the HD 330.

In S902, the CPU 301 makes print settings based on print setting information included in the print data. The print setting information includes information regarding the number of print copies of the print data and information regarding settings for post-processing performed on printed sheets. The number of print copies and the settings for post-processing are set by the user through the use of the external PC 112 or 113. The type of post-processing that can be set as print settings depends on the function of a post processing apparatus provided in the image forming apparatus 100.

In S903, the CPU 301 interprets the print data stored in the HD 330, and expands (rasterizes) the print data to image data based on the print setting information. At this time, image layout information (information regarding paper size, 2-in-1, 4-in-1, image scaling factor and so on) included in the print setting information is referred to, and the image data is expanded into the DRAM 304 in accordance with the layout information. When expanding the PDL data into images, the CPU 301 creates blank area information as shown in FIGS. 5A and 5B described above for the expanded image data, and stores the blank area information in the DRAM 304. The blank area information can be created in the same manner as that of Embodiment 1. When the image data has been expanded, the process advances to S904. In S904, the CPU 301 transfers the image data expanded into the DRAM 304 to the graphic processor 303.

In S905, the CPU 301 performs image processing in the graphic processor 303 independently of the print setting information. For example, if a situation arises in which the paper size is set to A4 in the print setting information, but the paper feeding unit 110 of the printer 323 contains only A4R paper sheets, the CPU 301 causes the graphic processor 303 to rotate images 90 degrees and output the images that are fitted to output sheets. When image processing on the image data is completed, the process advances to S906.

In S906, the CPU 301 causes the graphic processor 303 to transfer the image data that has undergone image processing to the DRAM 304. Upon completion of the transfer, the CPU 301 stores the image data stored in the DRAM 304 in the HD 330. In S907, the CPU 301 transfers, to the printer unit 107, the image data read from the HD 330 to the DRAM 304 at an appropriate timing while controlling the printer unit 107 via the printer interface 321 and the connector 322. At this time, the CPU 301 transmits the blank area information data as shown in FIGS. 5A and 5B to the printer unit 107 via the serial communication controller 325 in synchronization with the transfer of the image data.

In S908, the CPU 301 creates blank area information for page printing as shown in FIG. 6 based on the blank area information created in S905, as in S512. Then, the CPU 301 determines a sheet conveyance interval based on the information in the same manner as in Embodiment 1.

In S909, the CPU 301 forms images on sheets based on the expanded image data while conveying sheets at the determined sheet conveyance interval.

By performing such control, it is possible to, even when images are formed from print data received from the external PC 112 or 113, improve the productivity in image formation in consideration of image blank areas.

Embodiment 3

In Embodiment 1, an original document having a plurality of pages is automatically conveyed and read to generate image data, during which blank areas are detected from the original document. Then, the sheet conveyance interval at which the image data is transferred and printed onto a paper medium is changed based on blank area information. In the case where the user has requested to make two or more copies via the operation unit interface 327, the CPU 301 determines, after the first copy has been printed, the sheet conveyance interval based on blank information as shown in FIGS. 5A and 5B obtained through detection while reading and stored in the DRAM 304.

However, in the following cases, instead of detecting blank areas and storing the data to shorten the paper interval and applying the shortened paper interval to the second and subsequent copies, the shortened paper interval can be applied to the first and subsequent copies. For example, in the case where the reading speed is significantly faster than the printing speed (case 1), blank information of a plurality of pages of an original document is determined during the printing of the first sheet before the second sheet is fed. In this case, it is possible to perform control to shorten the paper interval when printing the first page as appropriate.

In the case where printing starts after all of the pages of an original document are read (case 2), for example, in the case where binding is performed after printing as post processing specified by the user, it is necessary to read all of the pages of the original document and lay out the images of the pages of the original document in a binding layout on sheets. In this case, control is performed to not start printing until the reading of the original document is completed, and the first page starts printing upon completion of storing the images of the original document in the HD 330. Accordingly, the sheet conveyance interval can be determined in consideration of blank area information and applied to the sheets for the first and subsequent copies.

In this case (case 2), the CPU 301 temporarily stores all of the images of the original document read by the reader unit 101 in the HD 330. Blank area information obtained while reading is stored, page by page, in the DRAM 304. The information is transmitted to the printer unit 107 after the CPU 301 expands the image data stored in the HD 330 into the DRAM 304 and lays out the data in the case where binding is set. The blank areas when forming images on sheets are changed accordingly when sheet layout is changed. Therefore, the blank area information transmitted to the printer unit 107 is changed by the CPU 301 when the image data is laid out by the DRAM 304.

Control performed by the CPU 301 in the above-described case will be described with reference to the flowchart shown in FIG. 9. The CPU 301 executing a program stored in the ROM 302 performs the steps shown in the flowchart of FIG. 9. The CPU 301 executes the flowchart shown in FIG. 9 in the case where the image forming apparatus 100 has the configuration of Case 1, or in the case where binding is set in the print settings. The flowchart is also executed in the case where the image forming apparatus 100 temporarily stores all of the images included in a single original document before printing, regardless of the print settings.

Steps S1001 to S1005 are the same as Steps S501 to S505 described in connection with FIG. 4, and thus descriptions thereof are omitted here.

In S1006, the CPU 301 determines whether or not there is an unread original document. If there is an unread original document, the CPU 301 returns the process to S1002, and repeats the process from S1002 to S1006. If it is determined in S1006 that there is no unread original document (all the pages of the single original document have been read), the process advances to S1007. The CPU 301 determines that the single original document has been read upon receiving a signal indicating that the original document feeding unit 102 is empty from a sensor provided in the original document feeding unit 102. In the case where reading is performed on the platen provided in the scanner unit 103, when the user indicates that the single original document has been read via the operation unit 104, the CPU 301 receives the indication and determines that the single original document has been read.

Figure 9:
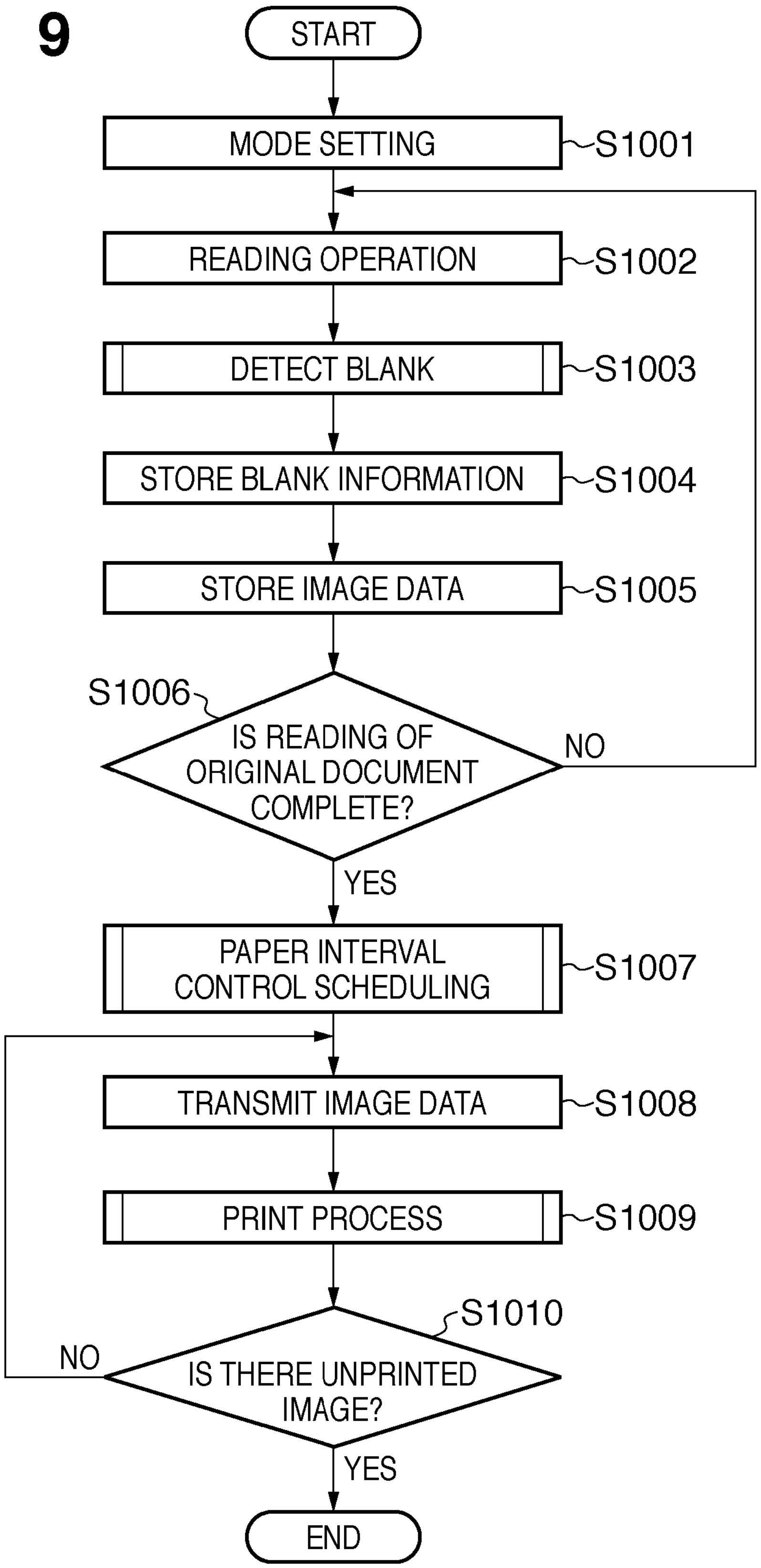
FIG. 9 is a flowchart showing a procedure of a print process according to Embodiment 3.

The process from S1007 to S1010 shown in FIG. 9 is the same as the process from S512 to S515 shown in FIG. 4, and thus a description thereof is omitted here. The process shown in FIG. 9 may be used when printing print data received via a network. In this case, the CPU 301 can be configured to not start printing until the interpretation and expansion of print data are completed, and perform control in the process from S1008 after the interpretation and expansion of print data are completed.

By performing control as described above, it is possible to determine a sheet conveyance interval for the first and subsequent copies in consideration of image blank areas formed on sheets.

Other Embodiments

The above embodiments have been described in the context of the image forming apparatus 100 having a color print function, but the image forming apparatus 100 may be an image forming apparatus having only a monochromatic print function.

In the case where the image forming apparatus 100 is an image forming apparatus having only a monochromatic print function, the reference interval described above may be shorter than that when the image forming apparatus 100 has a color print function. The reason is as follows. When images are formed on sheets using color developer (color toners), because Y, M, C and Bk toners are used, the amount of toner applied per unit area is 2 to 2.5 times the amount applied when forming monochrome images. Accordingly, the temperature required to fix the developer on a sheet needs to be higher when printing color images than when printing monochrome images. Conversely, when printing monochrome images, the temperature required to fix the developer on a sheet is lower than when printing color images. Accordingly, when the image forming apparatus 100 has only a monochromatic print function, the reference interval may be shorter than that when the image forming apparatus 100 has a color print function.

The reference interval varies depending on the type of apparatus.

In the above embodiments, an example has been described in which the CPU 301 of the controller 105 controls the printer unit 107 to perform printing, but part of the process may be performed by a CPU (not shown) provided in the printer unit 107.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-187484, filed on Aug. 12, 2009, which is hereby incorporated by reference herein in its entirety.

What is claimed is:

1. An image forming apparatus that conveys sheets and forms images on the conveyed sheets, comprising:

a determining unit configured to determine whether or not a sum of a first length and a second length is more than a reference value, wherein the first length is a length of a blank area from a trailing edge of a first sheet, the second length is a length of a blank area from a leading edge of a second sheet, and the second sheet follows after the first sheet;

a setting unit configured to, in a case where the determining unit determines that the sum of the first length and the second length is not more than the reference value, set a first sheet conveyance interval so that a sum of the first length, the second length and the first sheet conveyance interval is equal to or more than the reference value, and in a case where the sum of the first length, the second length and the first sheet conveyance interval is more than the reference value, set a second sheet conveyance interval which is shorter than the first sheet conveyance interval; and a conveying unit configured to convey the sheets at the first sheet conveyance interval or the second sheet conveyance interval set by the setting unit.

2. The image forming apparatus according to claim 1, wherein the blank area from the trailing edge of the first sheet is a right margin of the first sheet, and wherein the blank area from the leading edge of the first sheet is a left margin of the second sheet.

3. The image forming apparatus according to claim 1, further comprising an input unit configure to read an original document including a plurality of pages, and generate images to be formed on the sheet.

4. The image forming apparatus according to claim 1, further comprising a receiving unit configured to receive a setting for a number of copies for which images are to be formed, wherein the determining unit determines whether or not the sum of the first length and the second length is more than the reference value in a case where the receiving unit receives a setting for a plurality of copies.

5. The image forming apparatus according to claim 4, wherein the conveying unit conveys the sheets at the first sheet conveyance interval or the second sheet conveyance interval set by the setting unit for a second and subsequent copies.

6. A method for controlling an image forming apparatus that conveys sheets and forms images on the conveyed sheets, the method comprising the steps of:

determining whether or not a sum of a first length and a second length is more than a reference value, wherein the first length is a length of a blank area from a trailing edge of a first sheet, the second length is a length of a blank area from a leading edge of a second sheet, and the second sheet follows after the first sheet;

setting, in a case where the determining unit determines that the sum of the first length and the second length is not more than the reference value, a first sheet conveyance interval so that a sum of the first length, the second length and the first sheet conveyance interval is equal to or more than the reference value, and setting, in a case where the sum of the first length, the second length and the first sheet conveyance interval is more than the reference value, a second sheet conveyance interval which is shorter than the first sheet conveyance interval; and conveying the sheets at the first sheet conveyance interval or the second sheet conveyance interval set in the setting step.

7. A computer-readable storage medium storing a program for causing a computer to execute the method for controlling an image forming apparatus according to claim 6.

* * * * *